(12) United States Patent
Chan et al.

(10) Patent No.: US 10,277,413 B2
(45) Date of Patent: *Apr. 30, 2019

(54) MEETING INVITEE AS PROXY

(71) Applicant: International Business Machines Corporation, Armonk, NY (US)

(72) Inventors: Wai Ho Chan, Hong Kong (HK); Hon Chung Tang, Hong Kong (HK)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/806,682

(22) Filed: Nov. 8, 2017

(65) Prior Publication Data

US 2018/0069902 A1    Mar. 8, 2018

Related U.S. Application Data

(63) Continuation of application No. 15/252,272, filed on Aug. 31, 2016.

(51) Int. Cl.
*H04L 29/06* (2006.01)
*H04L 12/18* (2006.01)

(52) U.S. Cl.
CPC ...... *H04L 12/1831* (2013.01); *H04L 12/1818* (2013.01)

(58) Field of Classification Search
CPC ............. H04L 12/1822; H04L 12/1827; H04L 12/1831; H04L 12/1813; H04L 12/189; H04L 65/105; H04L 65/403
USPC ......................................................... 709/204
See application file for complete search history.

(56) References Cited

U.S. PATENT DOCUMENTS

| | | | |
|---|---|---|---|
| 2002/0158904 A1* | 10/2002 | Gunter | G06F 21/33 715/755 |
| 2003/0149605 A1* | 8/2003 | Cragun | G06Q 10/06311 705/7.13 |
| 2005/0027800 A1* | 2/2005 | Erickson | G06Q 10/10 709/204 |
| 2008/0040189 A1 | 2/2008 | Tong et al. | |

(Continued)

OTHER PUBLICATIONS

List of IBM Patents or Patent Applications Treated as Related, dated Nov. 7, 2017, pp. 1-2.

(Continued)

*Primary Examiner* — Ruolei Zong
(74) *Attorney, Agent, or Firm* — Jared C. Chaney

(57) ABSTRACT

An electronic invitation, including invitation proxy information, for a meeting is communicated to at least a first and a second invitee. A response is received from the first invitee including response proxy information indicating that the response to the invitation includes a request to proxy for the second invitee. Updating, in a memory, using the response proxy information, an attendance register to indicate that the first invitee will attend the meeting and that the first invitee may proxy for the second invitee. Communicating a proxy confirmation request to the second invitee and receiving a proxy confirmation response including proxy confirmation information. The attendance register is updated, in the memory, using the proxy confirmation information, to indicate that the second invitee will not attend the meeting and that the first invitee will proxy for the second invitee.

6 Claims, 6 Drawing Sheets

(56) References Cited

U.S. PATENT DOCUMENTS

| | | | |
|---|---|---|---|
| 2008/0147469 A1 | 6/2008 | Murillo et al. | |
| 2009/0063993 A1* | 3/2009 | Nyamgondalu | G06Q 10/06 715/752 |
| 2009/0083105 A1* | 3/2009 | Bhogal | G06Q 10/109 705/7.19 |
| 2009/0319926 A1 | 12/2009 | Chakra et al. | |
| 2012/0016708 A1* | 1/2012 | Dheap | G06Q 10/109 705/7.19 |
| 2013/0339077 A1 | 12/2013 | Maresh et al. | |

OTHER PUBLICATIONS

Chan et al., "Meeting Invitee as Proxy", U.S. Appl. No. 15/252,272, filed Aug. 31, 2016.

* cited by examiner

MEETING INVITEE AS PROXY

BACKGROUND

The present disclosure relates to proxies and, more specifically, to self-selecting proxies from among a pool of meeting invitees.

User devices connected via a network provide a useful tool for coordinating events requiring the involvement of widespread participants. The use of a network allows for consolidation of input from multiple user devices to a central coordinator.

SUMMARY

According to embodiments of the present disclosure a computer-implemented method for managing attendees of a computer-managed meeting, is described. The method involves communicating, by a computer via a network, to at least a first invitee and a second invitee, an electronic invitation for a meeting. The invitation can include invitation proxy information.

The computer receives, via the network, from the first invitee, an electronic response to the invitation including response proxy information. The response proxy information may indicate that the response to the invitation includes a request to proxy for the second invitee. The computer updates, in a memory, using the response proxy information, an attendance register for the meeting to indicate that the first invitee will attend the meeting and that the first invitee may proxy for the second invitee.

The computer communicates, via the network, a proxy confirmation request to the second invitee and receives, via the network, a proxy confirmation response including proxy confirmation information. The attendance register is updated, in the memory, using the proxy confirmation information, to indicate that the second invitee will not attend the meeting and that the first invitee will proxy for the second invitee.

A computing system and computer program product can embody the method and structures of the disclosure. The computing system can comprise a network, a memory configured to store a meeting register, and a processor in communication with the memory. The computing system can be configured to perform the method.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
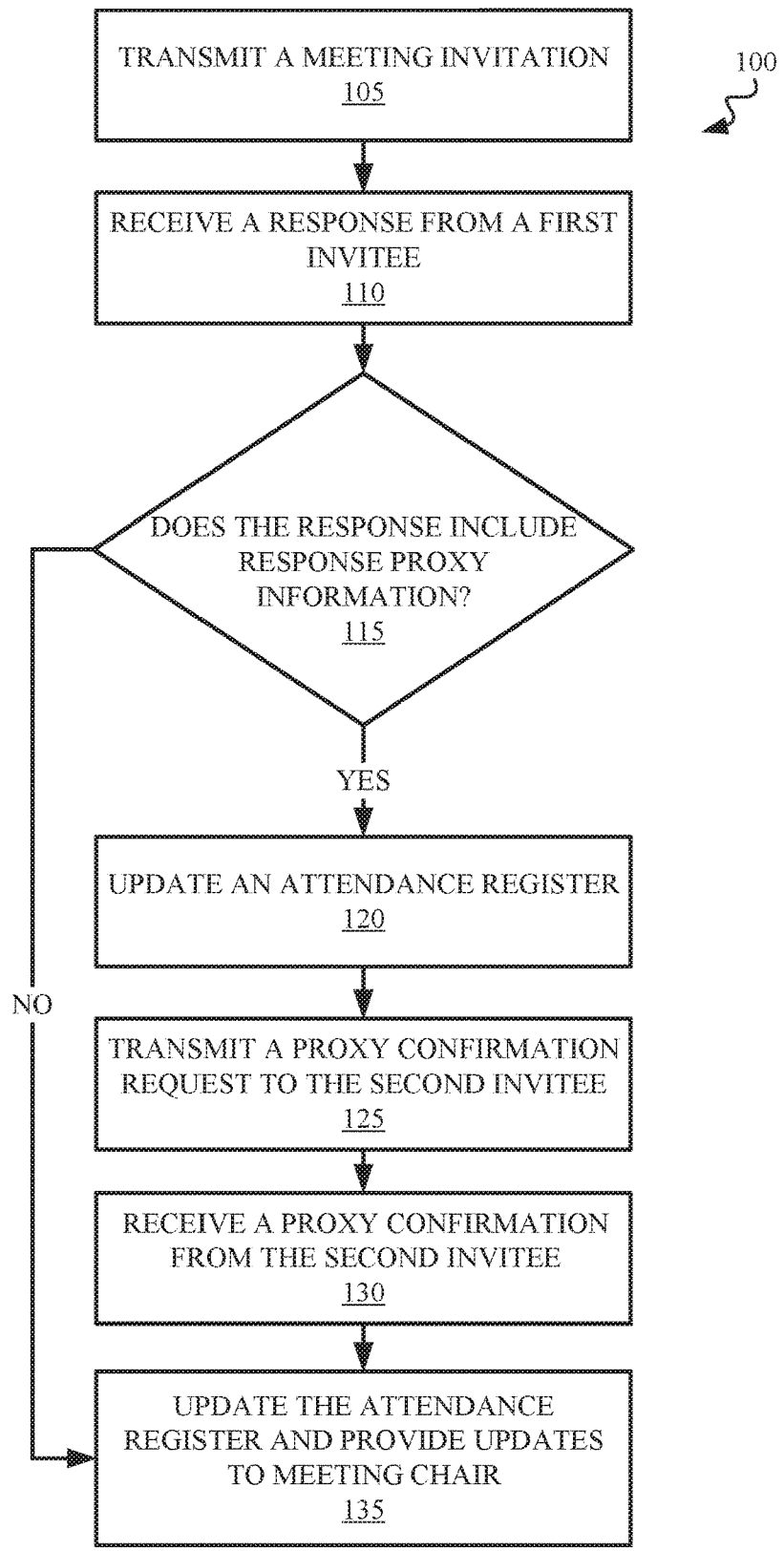
FIG. 1 depicts a flowchart is depicted of an example method for managing a meeting registry, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to proxies, and more particular aspects relate to proxies able to self-select from among meeting invitees. While the present disclosure is not necessarily limited to such applications, various aspects of the disclosure may be appreciated through a discussion of various examples using this context.

When scheduling a meeting, a meeting chair or organizer may be unable to account for conflicts on the part of each individual invitee. As businesses and communities grow ever more global and physically distanced among their members, it is of increasing importance to be able to organize meetings and gatherings efficiently. In particular, when scheduling cross-team or cross-group meetings, multiple parties, with perhaps differing organizational structures, may be involved. It may be difficult, and unnecessary, for all members of each team or group to be available at a given time. It may be difficult for a chair or organizer to determine if a representative from each group, or even just a particular group, is intending on attending and, in some cases, it may be a poor use of time to go forward with a meeting without at least a representative from a particular group. A chair may generally have access to a list of invitees/attendees, but this may often be of limited helpfulness in determining which groups are represented by the attendees.

The present disclosure presents a means for a computing system to manage a register of meeting attendees, in which an individual invitee can select to confirm or deny their own attendance to a meeting, and can indicate that the individual will act as a proxy for another invitee.

The present disclosure presents a means of allowing an individual invitee to select to not only their own attendance to a given meeting, but whether they will act as a proxy for another invitee. A chair may issue a meeting invitation to multiple invitees, not necessarily knowing which people belong to which functional groups, but generally wanting to have at least one representative from each group. When an invitee receives the invitation, they may select for themselves if they will represent another invitee, or invitees, at the meeting. A second invitee, selected to be represented at the meeting by the first invitee, can receive a notification about the first invitee's offer to proxy for them, and may have an opportunity to accept or decline the offer. In this way, invitees within each group can coordinate to ensure at least a representative is present at a given meeting. For instance, in some embodiments, when an invitee selects to proxy for a particular group, each member of that group can receive a proxy confirmation request. The proxy confirmation request may indicate that the invitee has selected to proxy for the entire group, instead of only indicating to each individual member that the invitee has offered to proxy for that individual member (i.e., each group member receiving the proxy confirmation request). If a member of the group has not yet received a proxy confirmation request, that member may be able to determine that a proxy for the group has not yet volunteered.

Referring now to FIG. 1, a flowchart is depicted of an example method 100 for managing invitations for a meeting and allowing invitees to self-select as proxies for other invitees.

A meeting invitation is transmitted, in operation 105, and may be directed to any number of invitees. It may generally be created by a single meeting chair, but may also be created by a chair committee or otherwise organized by a group. The invitation may be transmitted by any means, but examples include communication (e.g., over a network) as an email, as an SMS message, as a specialized calendar message or entry, etc.

A response is received from a first invitee, as in operation 110, and this response can generally indicate whether the first invitee intends to attend or not. This response may generally be received by the same means the meeting invitation was transmitted, e.g. an email communicated over the same network the invitation was received via, but it may be received by alternate means as well. This response may also be assessed to determine whether it contains response proxy information indicating the first invitee intends to proxy for another invitee or not, as in decision block 115. If the first invitee does not intend to proxy for another invitee, at operation 135 the method updates an attendance register and provide updates to the meeting chair.

The attendance register can track, or record, and display changes in the status of invitees and relevant proxy information, regarding confirmed attendance/absence or pending replies. The attendance register can be an electronic document such as a spreadsheet or chart, an electronic calendar entry, a database entry, for example, or can be any form of data structure or medium well known in the art that can be stored and/or processed by a computing system for such purposes. In some embodiments, updating the attendance register may be sufficient to supply updates to the meeting chair, as the computing system may make the register accessible to the chair to view. In other embodiments, the meeting chair may be notified via a pop-up text box or graphic, an email message, a specialized calendar alert, etc.

If the first invitee does intend to proxy for another invitee, the method updates the attendance register to at least reflect the first invitee's intention to attend the meeting, at operation 120. A second invitee, or several other invitees, may be identified, from response proxy information in the response received from the first invitee, for whom the first invitee intends to proxy. A proxy confirmation request may then be transmitted to the second invitee, or each other invitee for whom the first invitee has offered to proxy, as in operation 125.

The proxy confirmation request may generally be transmitted by the same means as the meeting invitation, but other means can be used. The proxy confirmation request may identify the first invitee and inform the second invitee of their offer to proxy. It may additionally provide the second invitee with an opportunity to accept or decline the first invitee as a proxy.

A proxy confirmation or denial is received, in operation 130, in response to the proxy confirmation request and containing proxy confirmation information. The attendance register and meeting chair are updated, in operation 135, according to the proxy confirmation information.

Figure 2A:
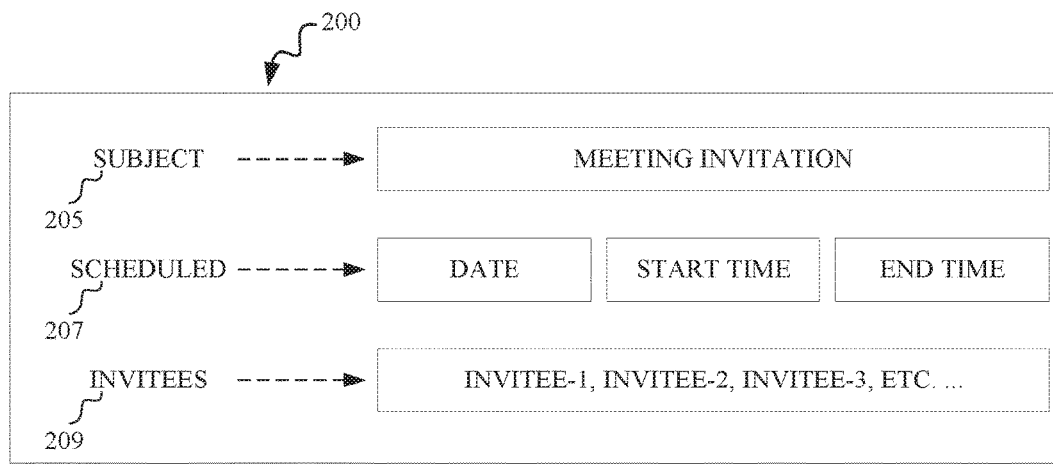
FIG. 2A depicts an example meeting invitation generation field, according to an embodiment of the present disclosure.

Referring now to FIG. 2A, an example meeting invitation generation field 200 is depicted, according to an embodiment of the present disclosure. The invitation generation field may generally be viewed via a display, i.e. a graphical user interface. The display may have a touch screen or a non-touch screen. The display may be for example, but not limited to, a LCD, PDP, OEL or a projection type display. Though the invitation may take any form the meeting chair desires, this example depicts some basic fields that may generally be desirable. It is to be understood that the depicted organization of this disclosure as meeting scheduling communications as throughout FIG. 2A-D is to be non-limiting, as other possible organizations/configurations are possible.

The invitation may generally include a subject 205, which may be set according to the meeting chair's specifications. It may be generic, as in "MEETING INVITATION" here, or may indicate more information about the meeting, e.g. who the key participants are, expected topics of conversation, etc.

The invitation may generally indicate a scheduled time 207 for the meeting. It may include a date, start time, and end time, as in this example, or in other embodiments, may indicate a date and a duration, or otherwise convey to the invitees how much time to set aside and when. If a physical meeting is desired, a location for the meeting may also be scheduled. In some embodiments, a digital meeting room may be used.

The invitation may generally indicate who the invitees 209 are. This may appear as a field each invitee may view on their individual invitation, or may be a field only visible and modifiable to the meeting chair. Invitations may be generated according to specific specifications set by the meeting chair, or may automatically generate invitations using a template and minimal data input provided by the meeting chair.

Figure 2B:
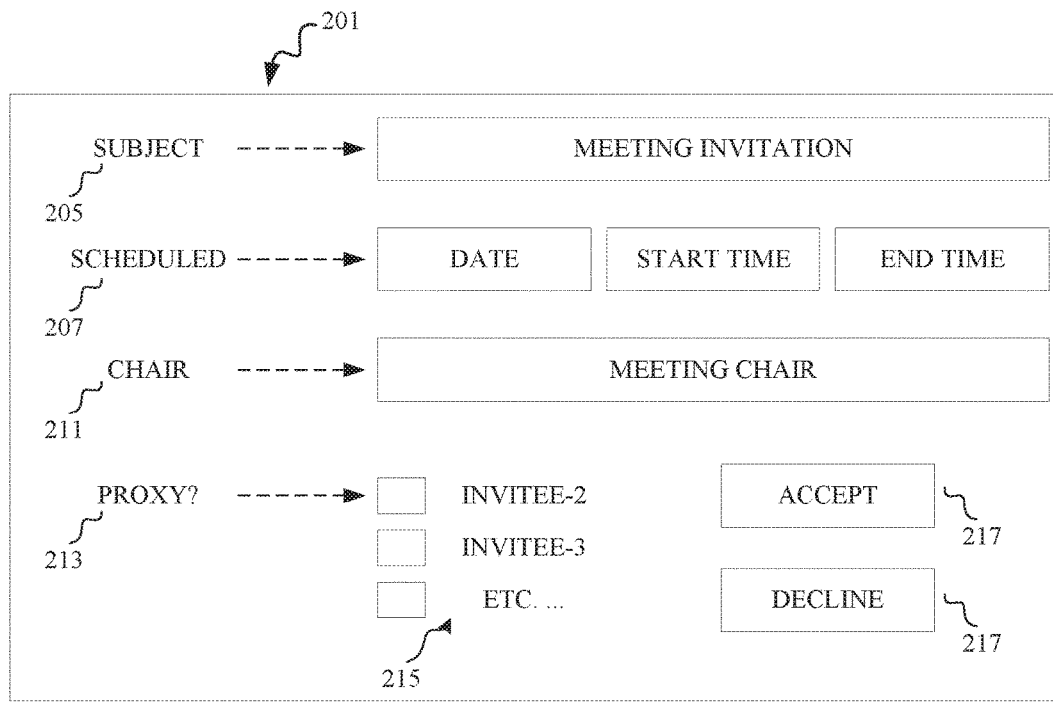
FIG. 2B depicts an example invitation, according to an embodiment of the present disclosure.
Figure 2C:
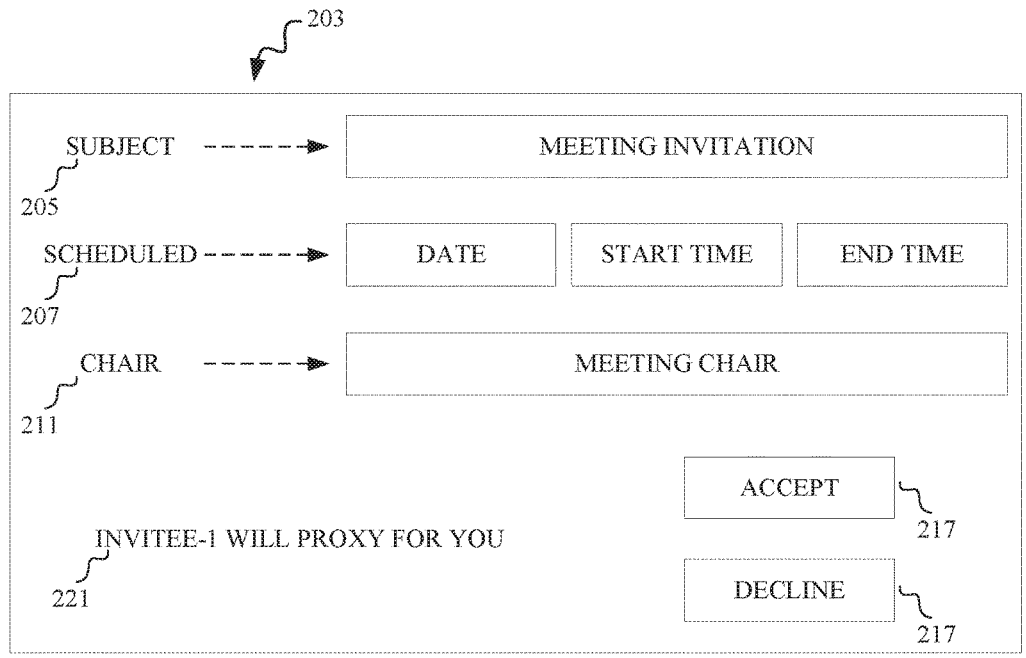
FIG. 2C depicts an example proxy confirmation request, according to an embodiment of the present disclosure.

Referring now to FIG. 2B, an example invitation 201 with invitation proxy information 213, as received by an invitee is depicted, according to an embodiment of the present disclosure. The invitation can be communicated and received by means previously described. The invitation can be, or can be presented, in a form to generally be viewed via a display, i.e. a graphical user interface. The display may have a touch screen or a non-touch screen. Like the invitation generation field 200 in FIG. 2A, the invitation 201 may display a subject 205 and scheduled time 207. These field may be displayed as entered by the meeting chair, or the system may be configured to convert the meeting chair's input into a different desired format. The invitation may indicate the identity of the meeting chair 211, to provide invitees with a point-of-contact.

The invitation may also provide invitation proxy information 213, giving each invitee an opportunity to proxy for other invitees. The invitation may provide a checklist of attendees 215 where an invitee might select other invitees to proxy for, as in this example, but other means may also be used to allow the invitee to opt to proxy for another invitee. Names may be dragged-and-dropped from a list, entered into a blank field, supplied by suggestion once the invitee begins to type, etc. The invitation may also provide action buttons 217 where an invitee may selection to attend or decline, or some other means for the invitee to indicate whether or not they intend to attend the meeting. The invitee's response may be automatically generated according to the attendance and proxy information provided by the invitee Referring now to FIG. 2C, an example proxy confirmation request 203 is depicted, according to an embodiment of the present disclosure. The proxy confirmation request may generally be viewed via a display, i.e. a graphical user interface. The display may have a touch screen or a non-touch screen. The recipient of the proxy confirmation request 203, will in some cases have already received a meeting invitation 201 (FIG. 2B) and information such as the subject 205, scheduled time 207, and meeting chair 211 may serve to identify the correct meeting for the recipient. In some embodiments, the meeting may be identified by a tag.

The proxy confirmation request 203 indicates to the recipient a particular invitee who intends to proxy for them (the recipient). This may be via a line of text in the proxy confirmation request 203, as in line 221 of this example, but other means of indicating the information are equally acceptable. The proxy confirmation request may provide action buttons 217 to allow the recipient to accept or decline the other invitee's (INVITEE-1) offer to proxy, or some other means for the recipient to indicate whether they will accept the proxy or not may be used. For example, the recipient may have their system configured such that if a proxy confirmation request is received with INVITEE-1 as the proxy, then the proxy request will automatically be confirmed, or such an automated response may be set for only certain circumstances, e.g. if the recipient were to have their system set for them to be "out-of-the-office." As another example, a recipient may receive a proxy confirmation request with multiple other invitees offering to proxy, and the recipient may choose from a list, or other display, who they will accept as a proxy.

Figure 2D:
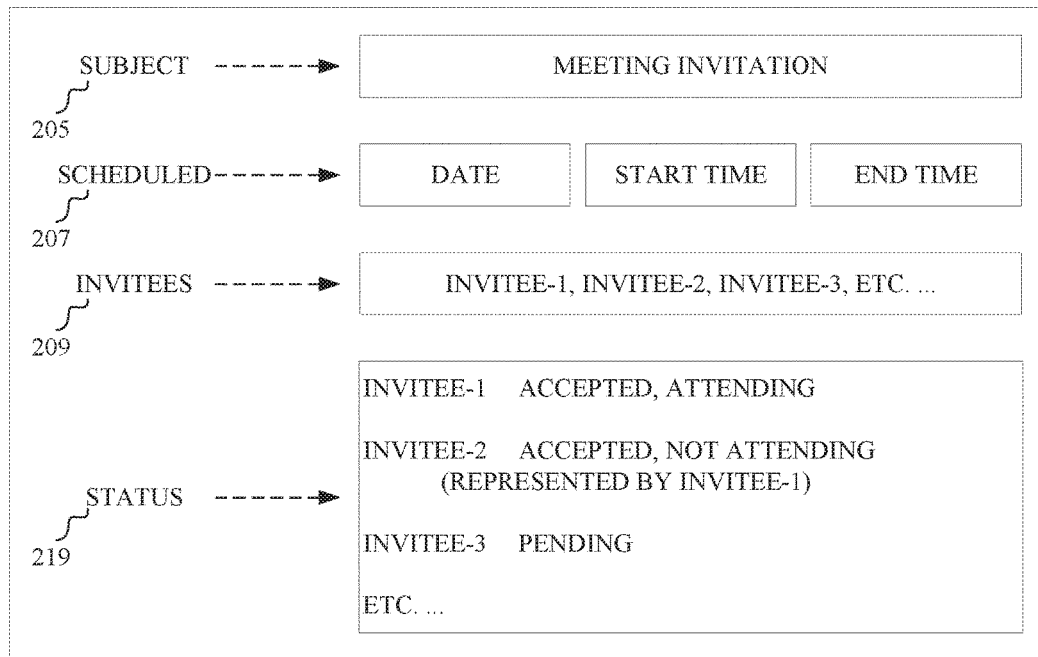
FIG. 2D depicts an example attendance register, according to an embodiment of the present disclosure.

Referring now to FIG. 2D, an example attendance register 204 is depicted, according to an embodiment of the present disclosure. The attendance register may generally be viewed via a display, i.e. a graphical user interface. The display may have a touch screen or a non-touch screen. The attendance register 204 may have an appearance generally similar to the meeting invitation generation field 200 (FIG. 2A) for ease of understanding, as in this example, but is not restricted by such guidelines, and may take any format which displays meeting attendance information. Like the proxy confirmation request 203 (FIG. 2C) discussed above, the attendance register 204 may have fields such as subject 205, scheduled time 207, and invitees 209 to assist a meeting chair in identifying the correct meeting. Other fields may be supplied to achieve the same purpose.

The attendance register 204 may also generally supply a field indicating the attendance status of each invitee 219. In this example the status is given as lines of text but, in other embodiments, this information could be provided using a different textual display, such as a chart, a spreadsheet, etc.

Figure 3A:
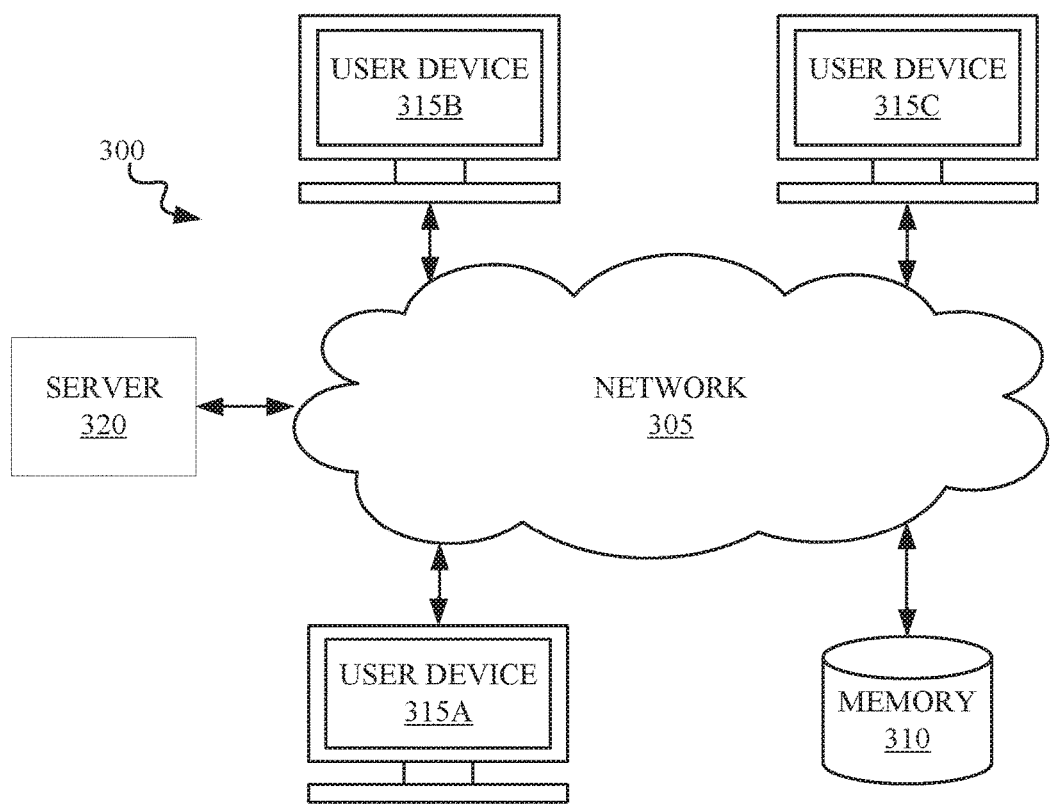
FIG. 3A depicts an example network environment, according to an embodiment of the present disclosure.

Referring now to FIG. 3A, an example network environment 300 is depicted, according to an embodiment of the present disclosure. The network 305 may communicate messages among the memory device 310 and the user devices 315A-C. Here, "network" may include one or more communication links and/or communication networks, such as a PAN (personal area network), a LAN (local area network), a WAN (wide area network), or a combination of networks, such as the Internet or a cloud system. The memory 310 may contain the attendance register and proxy information, and may be configured to be accessible to only a user device (e.g., one of user devices 315A-C) associated with the meeting chair, or each user device 315A-C with access to the network. The memory 310 may be part of a computer, e.g. it may be part of server 320 or a part of any one of user devices 315A-C, or may be a standalone memory or storage system. Each user device 315A-C can be associated with either a chair, an invitee, or other persons on the network who are not involved with a particular meeting. Each user device 315A-C can be any type of computing device, and may be any type of stationary or mobile computing device, including a desktop computer, a mobile computer or computing device, a laptop computer, a notebook computer, a tablet computer, a mobile phone, or other type of mobile device. The computing device may be a virtual machine To carry out the method, i.e. example method 100 of FIG. 1, in this example environment 300, a meeting chair may generate a meeting invitation on a user device 315A. The meeting invitation may be transmitted over the network 305 directly to other user devices 315B-C or, in some embodiments, other components may be involved. For example, the server 320 may serve as a coordinating component in some embodiments of the disclosure. In such an embodiment, an invitation generation template may be stored in the memory 310 and retrieved by the server 320. The template may then be transmitted to the user device 315A which requested it. In other embodiments, such a template may be retrieved from the memory by the user device 315A itself, stored on the user device 315A, the server 320, or elsewhere on the network 305. In some embodiments, the memory 310 may be integrated into the server 320. The server 320 may be implemented in one or more computer systems, including one or more servers, which may be any type of computing device described herein or otherwise known that is capable of enabling the corresponding functionality described herein. The server computer may be, for example, but is not limited to, a workstation, a rack-mount type server, a blade type server, or a mainframe server and may run, for example, a hypervisor for creating and running one or more virtual machines.

Once transmitted, invitations containing invitation proxy information may be received by various recipient user devices, e.g. user device 315B, and their responses returned via the network 305. Responses may be received by the chair's user device 315A, the server 320, or another device processing the method. The response may be processed and the attendance register, which may be stored in the memory 310 or a local device, updated appropriately. As necessary, proxy confirmations requests may be generated automatically and transmitted, or may require input from the meeting chair for generation and transmittal. The generation and transmittal of the proxy confirmation requests may generally follow the form of the generation and transmittal of the meeting invitation. A proxy confirmation request template may be stored along with the invitation generation template on the memory 310 or elsewhere, e.g., another computer or device connected to network 305.

As with the meeting invitations, the proxy confirmation requests may be transmitted via the network 305 to the appropriate user device(s), e.g. user device 315C. The proxy confirmation request may be transmitted from the server 320, or some other device processing the method, or may be transmitted directly from the meeting chair's user device 315, e.g. in embodiments which require input from the meeting chair before transmitting the proxy confirmation requests.

Proxy confirmation requests may be transmitted to the appropriate user devices 315C, and their responses, with proxy confirmation information, received, via the network 305. Upon receipt of a proxy confirmation response, the server 320, the chair's user device 315A, or another device processing the method may update the attendance register accordingly.

Figure 3B:
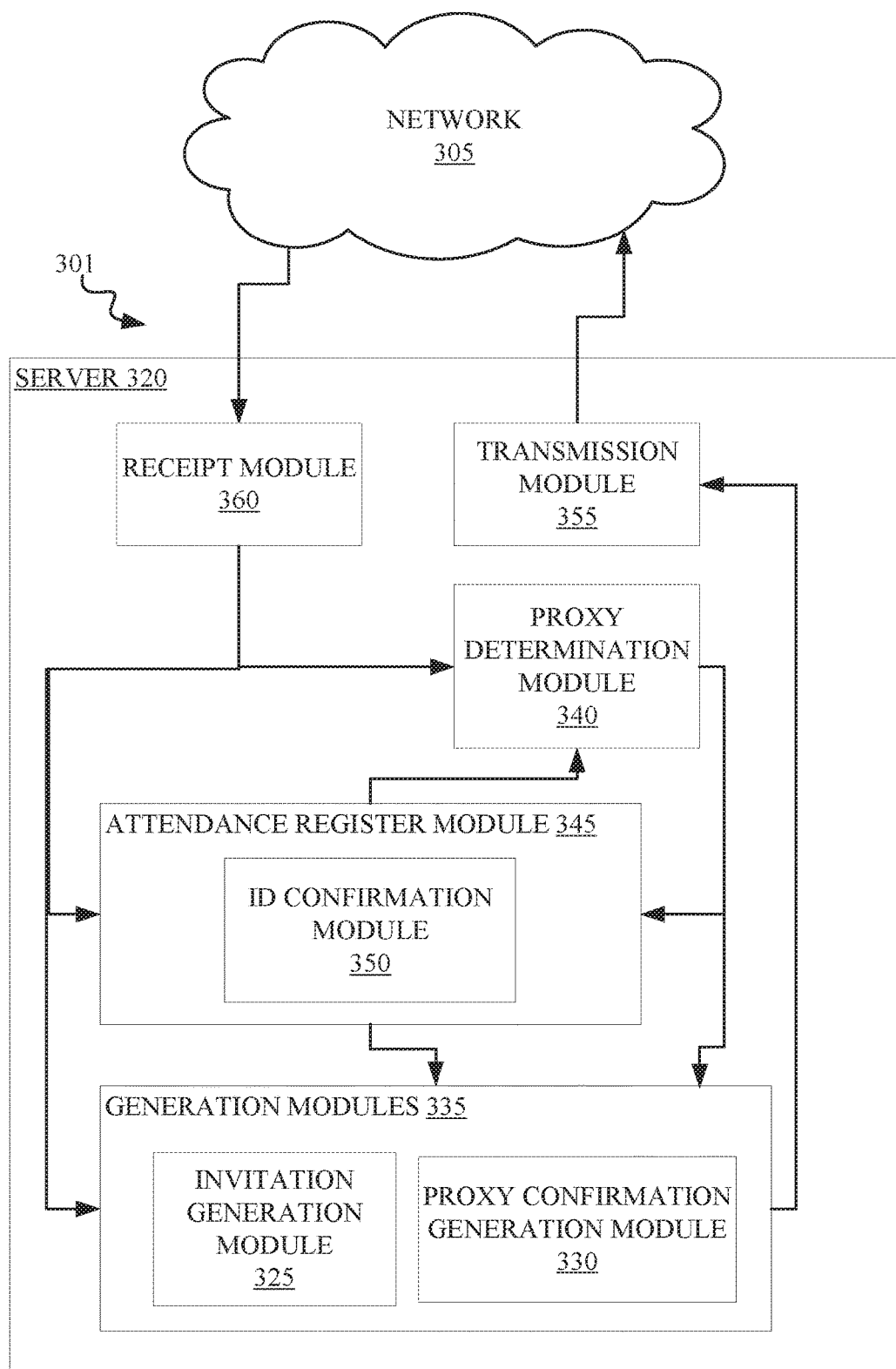
FIG. 3B depicts an example system, according to an embodiment of the present disclosure.

Referring now to FIG. 3B, an example system 301 for carrying out example method 100 of FIG. 1 is depicted. This example depicts the system as interior to server 320, but it may be contained within other devices, or carried out by several devices in concert, as well. The system may generally be in contact with or integrated with a network 305, through which communications may be transmitted, via the transmission module 355, and received, via the receipt module 360, among the possibly widespread invitees of a particular meeting.

Example system 301 contains generation modules 335, such as invitation generation module 325 and proxy confirmation generation module 330, which may store templates and may also allow the generation of new templates. In some embodiments, attendance register module 345 can include one or more attendance registers (such as, for example, illustrated in FIG. 2D), and the generation modules 335 can receive input from the attendance register module 345 and from the proxy determination module 340, as well as direct input from a user device via the receipt module 360. In some embodiments, this may allow for automatic generation of meeting invitations and proxy confirmation requests, which can include proxy information such as described in FIGS. 2A through 2D. For example, a meeting chair may input an invitee list either directly into the system, or via the network 305, in which case the data would reach the attendance register module 345 via the receipt module 360. Invitee information may then be received by the invitee generation module 325 from the attendance register module 345. In some embodiments, the invitation generation module 325 may use this information, along with other meeting specifics input by the meeting chair, to automatically generate meeting invitations and transmit the invitation to the invitees via the transmission module 355.

Responses from invitees may be received from the network 305 via the receipt module 360. Responses can be sent to the attendance register module 345, which can maintain the attendance register up-to-date according to the invitees' responses. Responses may also be sent to the proxy determination module 340, which may assess responses to determine if response proxy information is included and a proxy confirmation request is necessary. The proxy determination module 340 may, alternatively or in parallel, receive responses requiring a proxy determination assessment from the attendance register module 345.

Additionally, in some embodiments, the attendance register module 345 may contain an Identification (ID) confirmation module 350. For example, in an embodiment where the meeting chair wished to limit access to the attendance register, the ID confirmation module 350 may grant or deny access to the attendance register, e.g. based on comparison of a user requesting access against a list of users allowed access to a particular register.

Figure 4:
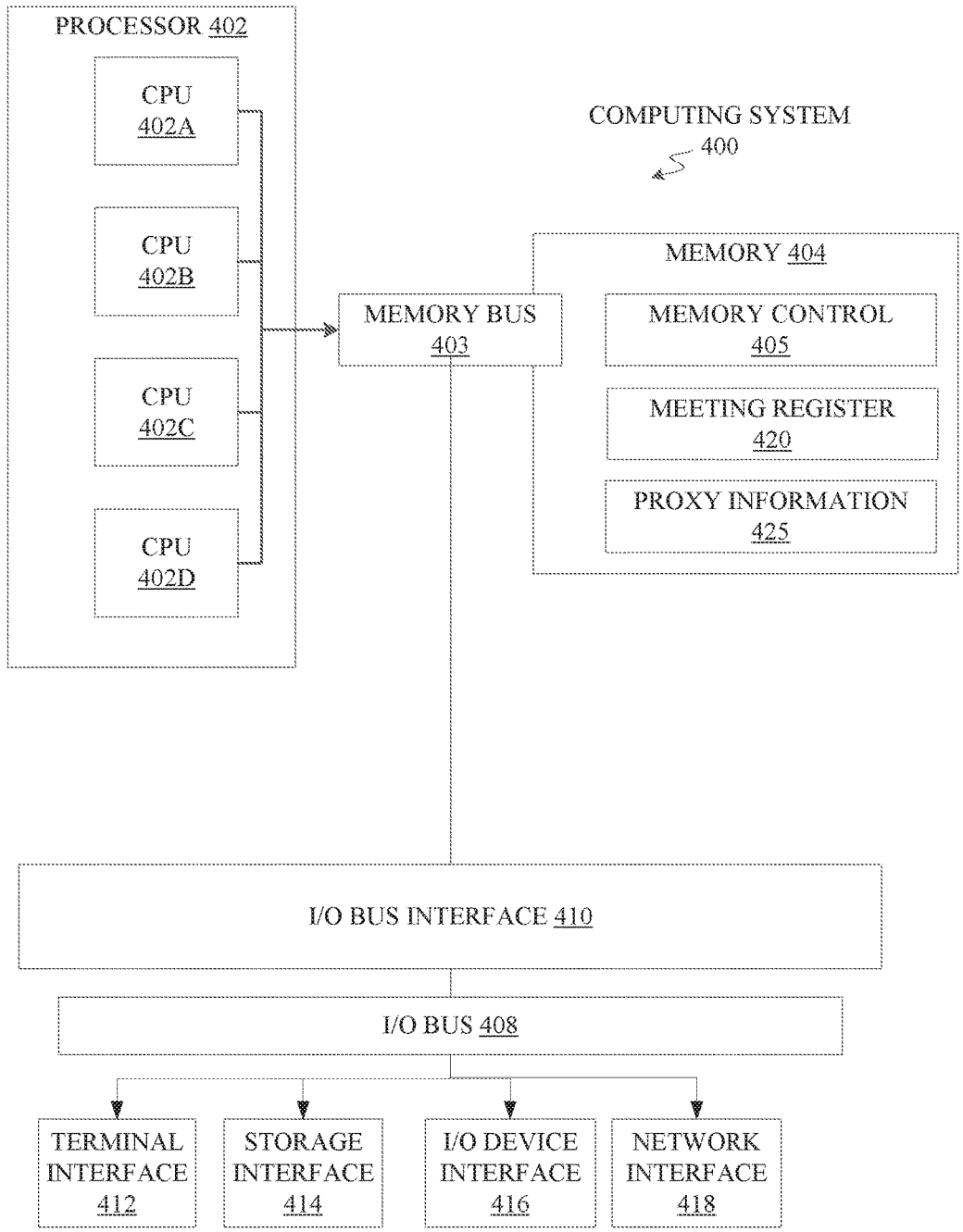
FIG. 4 depicts a high-level block diagram of an example computer, according to an embodiment of the present disclosure.

Referring now to FIG. 4, shown is a high-level block diagram of an example computing system (e.g., a computer) 400 that may be used in implementing the proxy methods, and any related functions or operations, described herein (e.g., using one or more processor circuits or computer processors of the computer), in accordance with embodiments of the present disclosure. In some embodiments, the major components of computer system 400 comprise one or more CPUs within processor 402, memory subsystem 404, terminal interface 412, storage interface 414, I/O (Input/Output) device interface 416, and network interface 418, all of which may be communicatively coupled, directly or indirectly, for inter-component communication via memory bus 403, I/O bus 408, and I/O bus interface unit 410.

Processor 402 of computer system 400 contains one or more general-purpose programmable central processing units (CPUs) 402A, 402B, 402C, and 402D, herein collectively referred to as CPU 402. In some embodiments, a computer can contain multiple processors typical of a relatively large system; however, in other embodiments a computer can alternatively be a single CPU system. Each CPU 402 may execute instructions stored in the memory subsystem 404 and may comprise one or more levels of on-board cache.

Embodiments of memory subsystem 404 can include a memory suitable to store structures such as illustrated in FIGS. 2A-2D of the disclosure, such as meeting register 420 and proxy information 425. In some embodiments, the memory subsystem 404 may comprise a random-access semiconductor memory, storage device, or storage medium (either volatile or non-volatile) for storing data and programs. In some embodiments, the memory subsystem 404 may represent the entire virtual memory of the computer system 400, and may also include the virtual memory of other computer systems coupled to the computer system 400 or connected via a network. The memory subsystem 404 may be conceptually a single monolithic entity, but, in some embodiments, the memory subsystem 404 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 404 may contain elements for control and flow of memory used by the CPU 402. This may include a memory controller 405.

Although the memory bus 403 is shown in FIG. 4 as a single bus structure providing a direct communication path among the CPUs 402, the memory subsystem 404, and the I/O bus interface 410, the memory bus 403 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 400 may be a multi-user mainframe computer system, a single-user system, or a server computer or similar device that has little or no direct user interface, but receives requests from other computer systems (clients). Further, in some embodiments, the computer system 400 may be implemented as a desktop computer, portable computer, laptop or notebook computer, tablet computer, pocket computer, telephone, smart phone, mobile device, or any other appropriate type of electronic device.

It is noted that FIG. 4 is intended to depict the representative major components of an example computer system 400, but is not intended to limit embodiments. In some embodiments, however, individual components may have greater or lesser complexity than as represented in FIG. 4, components other than or in addition to those shown in FIG. 4 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for managing attendees of a computer-managed meeting, the method comprising:
   communicating, by a computer via a network, an electronic invitation for a meeting to a first invitee and to a second invitee;
   receiving, by the computer via the network, an electronic response to the invitation from the first invitee, the response including response proxy information;
   determining, by the computer, based at least in part on the response proxy information, that the response to the invitation includes a request to proxy for the second invitee;
   updating, by the computer, in a memory, using the response proxy information, an attendance register for the meeting to indicate that the first invitee will attend the meeting and that the first invitee may proxy for the second invitee;
   communicating, by the computer via the network, a proxy confirmation request to the second invitee;
   receiving, by the computer via the network, a proxy confirmation response from the second invitee, the proxy confirmation response including proxy confirmation information; and
   updating, by the computer, in the memory, using the proxy confirmation information, the attendance register for the meeting to indicate that the second invitee will not attend the meeting and that the first invitee will proxy for the second invitee.

2. The method of claim 1, wherein the proxy confirmation response from the second invitee is an automated response occurring in response to the first invitee being identified, by a user device associated with the second invitee, as a particular user.

3. The method of claim 1, wherein the proxy confirmation response from the second invitee is an automated response occurring in response to the first invitee being identified, by a user device associated with the second invitee, as a member of a particular group.

4. The method of claim 1, wherein the first invitee selects one or more other invitees to proxy for by selecting a group to proxy for, the one or more invitees including the second invitee, and
   wherein each of the one or more other invitees is a member of the group selected.

5. The method of claim 4, wherein the computer communicates a proxy confirmation request to each of the one or more invitees that are members of the group selected.

6. The method of claim 5, wherein the computer receives a proxy confirmation response including proxy confirmation information from each of the one or more invitees that are members of the group selected; and
   in response, the computer updates, in the memory, according to the proxy confirmation information, the attendance register to indicate that each of the one or more invitees that are members of the group selected will not attend the meeting and that the first invitee will proxy for each of them.

\* \* \* \* \*